United States Patent [19]

Podvin et al.

[11] Patent Number: 4,597,643
[45] Date of Patent: Jul. 1, 1986

[54] PIVOTABLE FILTER HOLDER FOR MICROSCOPES

[75] Inventors: T. Charles Podvin, Poway; Peter J. Van Benschoten, Rancho Santa Fe, both of Calif.

[73] Assignee: The Micromanipulator Microscope Company, Inc., Escondido, Calif.

[21] Appl. No.: 538,773

[22] Filed: Oct. 4, 1983

[51] Int. Cl.[4] .................. G02B 7/00; E05D 11/08; E05D 15/00

[52] U.S. Cl. .................................. 350/507; 16/223; 16/364; 350/315

[58] Field of Search ............... 350/501, 507, 523–528, 350/520, 315, 313, 559, 248–249, 318, 254, 245, 247, 632, 522; 351/57–59; 354/79; 16/223, 341, 364, 367, 389; 285/397; 403/296

[56] References Cited

U.S. PATENT DOCUMENTS

| | | | |
|---|---|---|---|
| 1,311,185 | 7/1919 | Silverman | 350/525 |
| 1,754,282 | 4/1930 | Owens | 350/315 |
| 1,970,728 | 8/1934 | Bauersfeld | 350/254 |
| 2,418,602 | 4/1947 | Richards | 350/526 |
| 2,537,846 | 1/1951 | Munn | 350/507 |
| 2,544,371 | 3/1951 | Weisek | 350/254 |
| 3,150,460 | 9/1964 | Dees | 403/296 |
| 3,306,633 | 2/1967 | Haake | 285/397 |

FOREIGN PATENT DOCUMENTS

| | | | |
|---|---|---|---|
| 3018488 | 11/1981 | Fed. Rep. of Germany | 350/318 |
| 534595 | 3/1941 | United Kingdom | 350/318 |
| 1059967 | 2/1967 | United Kingdom | 403/296 |

*Primary Examiner*—William H. Punter
*Attorney, Agent, or Firm*—Fitch, Even, Tabin & Flannery

[57] ABSTRACT

Apparatus is provided for attachment to a microscope which alternately positions a filter in alignment with the objective of the microscope and stowed along the side of the body of the microscope. A stationary post is screwed to an accessory fitting associated with the body of the microscope, and a filter holder, which includes a filter-retaining ring and an extending stem, is mounted for rotation from the end of the end of the post. To register the holder stabilized in its aligned and stowed positions, the stem rotates against a face of the post in which a groove is formed, and the stem is biased against the face by a spring so that it catches in the groove in either of the registered positions. The post is screwed to the fitting by means of a stud threaded at both ends, one end being insertable into the fitting opening and one end being insertable into an axial threaded bore of the post, and with the post in the correct rotational position, a set screw is tightened against the stud, fixing the rotational positions of the post and stud. This allows the post to be removed from and reattached to the fitting in an indexed rotational position which positions the filter holder, when in its aligned position relative to the post, directly below the objective. The filter is retained in the ring by a removable O-ring, whereby the filter is removable so that any one of a collection of filters may be retained in the ring.

17 Claims, 8 Drawing Figures

PIVOTABLE FILTER HOLDER FOR MICROSCOPES

The present invention relates to an assembly which attaches to a microscope or other optical device and provides for placing a filter or the like within its optical path.

BACKGROUND OF THE INVENTION

When examining an object under the microscope, it is frequently desirable to view the object through a filter. For example, due to differential magnification of light of various wavelengths, polychromatic light will product chromatic aberration in a magnified optical image, causing the edges of the image to be fuzzy. It is known that a colored filter, which filters out most light outside of a relatively narrow bandwidth, reduces chromatic aberration, and colored filters are sometimes positioned in the light path of a microscope, e.g., in front of the objective, for this purpose. Unfortunately, a colored filter also significantly reduces the amount of the viewing light and also colors the image, obscuring certain features. Therefore, it is often desirable to observe certain subjects both with and without a colored filter.

If a technician is viewing a large number of subjects with and without a filter, it would be very convenient to have a filter readily available and to be able to quickly move the filter into the light path of the microscope and out of the light path. Such convenience may be provided by an attachment which provides for pivoting of a filter between a position in front of the objective of a microscope and a position remote from the objective. Such a device should stow the filter in its position remote from the objective so as not to interfere with a technician operating the microscope.

It is a primary object of the invention to provide an assembly which is removably attachable to a microscope or the like and which when attached to the microscope holds a filter or the like for alternative positioning in front of the objective of the microscope and stowed remote from the objective of the microscope.

SUMMARY OF THE INVENTION

An assembly is provided for alternately positioning a filter in front of the objective of a microscope and positioning the filter stowed along the side of the microscope. The assembly includes a post which is attachable to an accessory fitting of the microscope and a filter holder that includes a filter-retaining ring and a stem. The stem is mounted from the post to pivot about an axis with the axis of the stem appropriately angled from the pivotal axis to alternately place the ring in the aligned position in front of and generally normal to the objective and in the stowed position closely adjacent the body of the microscope. Registration means associated with the stem mounting stabilizes the stem at the objective-aligned position and at the stowed position.

Where the accessory fitting provides a threaded opening into which the post is screwed, means are provided to index the post into the same rotational position each time the assembly is attached to the microscope, ensuring that the filter-retaining ring will be registered into correct alignment with the objective.

The assembly may be used to hold a wide variety of filters or the like as the filter-retaining ring provides for quick and easy replacement of the filter. The ring has an annulus or ledge on which the filter seats and an internal groove for receiving an O-ring that retains the seated filter in place.

DETAILED DESCRIPTION OF THE PREFERRED EMBODIMENT

Figure 1:
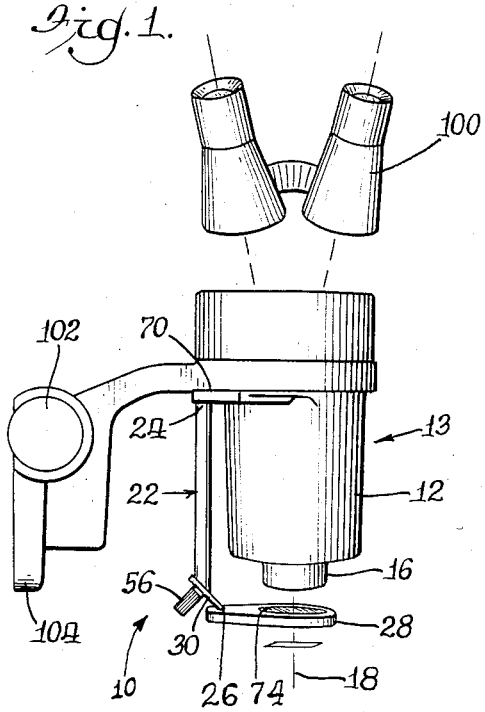
FIG. 1 is a perspective view of a microscope to which is attached a filter-holding assembly, embodying various features of the present invention, the assembly shown with the filter positioned in front of the objective.

In accordance with the present invention, a filter-holding assembly 10 is provided for attachment to the body 12 of a microscope 13 and which provides for alternate positioning of filter 14 (FIG. 3) in a position (FIG. 1) aligned in front of an objective 16 of the microscope and a stowed position (FIG. 2) remote from the objective of the microscope. The assembly 10 holds the filter 14 in its objective-aligned position generally normal to the axis of the objective and in its stowed position closely adjacent the microscope body 12 so as not to interfere with a technician using the microscope 13. The assembly 10 includes a stationary member, such as a post 22, which is attachable to an accessory fitting 24 disposed at a location above the objective 16 along the side of the microscope body 12, so that the post, which is stationary once attached, depends from the fitting. A filter holder 26 includes a filter-retaining ring 28 and an extending rod or stem 30, and the stem is mounted by means, such as a shaft 32 (FIG. 3) of a bolt 34, from the stationary post 22 for relative rotation to pivot the ring between its aligned and stowed positions.

The post 22 is aligned with the body 12 along its side, and the stem 30 is mounted at an appropriate acute angle from the shaft 32 to swing the filter between its aligned position generally normal to the objective 16 and its stowed position close to the body. Thus, where the microscope body 12 is elongated with the objective 16 mounted therein generally coaxially and the stationary post 22 extends generally parallel to the objective axis; the stem 30 of the filter holder 26 is mounted for rotation about the shaft 32 at approximately a 45° angle relative to the post axis so that the stem rotates from a position extending downward to below the objective 12 (FIG. 1) to a position (FIG. 2) extending upward along the body of the microscope.

With the post 22 extending generally parallel to the objective axis 18 and the stem 30 mounted for rotation from the post 22 at about a 45° angle relative thereto, positioning the filter-retaining ring 28 generally normal to the objective axis requires that the plane of the ring be angled from the stem at about a 45° angle. Actually, it is preferred that the filter 14 be slightly skewed from perpendicular to the objective axis 18 so that reflections from the surfaces of the filter are directed away from the objective, and typically the filter will be skewed by about 2.5° to 5° from perpendicular to the objective axis 18. Thus the angle of the plane of ring 28 relative to the axis of the stem 30 is between 2.5 and about 5° more or less than the angle that would position the filter 14 perpendicular to the objective axis 18. It is to be understood that it is not necessary that the stem 30 angle 45° from its rotational axis, i.e., the axis of the shaft 32, although this angle provides for a 90° difference between the two positions, and if the stem is at an acute angle other than a 45° angle relative to the post 22, the stem-ring angle is adjusted accordingly.

In accordance with an important aspect of the present invention, registration means associated with the stem mounting are provided for stabilizing the filter holder both in its aligned position and in its stowed position without locking the filter holder in either of these positions. This allows the technician to simply turn the filter holder 26 to one of the registered positions with assurance that it will remain stabilized in that position until he again turns the filter holder to register the holder to the other stabilized position.

Figure 5:
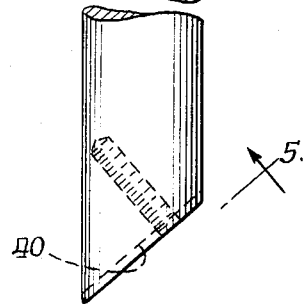
FIG. 5 is a view of the post taken along line 5—5 of FIG. 4.

The preferred means of registering the filter holder in the two positions includes a detent means or groove 40 (FIG. 5) formed in a lower face 42 of the post 22, along which the cylindrical stem 30 pivots and means, such as a spring 44, for biasing the stem against the face and, when in one of the registered positions, upward into the groove. The lower face 42 of the post 22 is formed at an acute angle of about 45° relative to the axis of the cylindrical post, giving it an elliptical shape, and the groove 40, having converging angled sidewalls 46, is formed in the lower face 42 along the major elliptical axis, that is, from the lower end to the upper end of the face. The bolt shaft 32 about which the stem 30 rotates, is screwed tightly into a threaded blind bore 48 formed in the post extending perpendicularly from along the major elliptical axis of the lower face 42 and extending through a radial bore 50 through the cylindrical stem 30. Interposed between the head 52 of the bolt 34 and the stem 30 are a turning knob 54, which is affixed to the stem, and the spring 44 which is compressed between a surface 55 of the knob 54 and the bolt head, thereby biasing the stem upward against the face 42 of the post 22.

By means of the knob 54, the technician rotates the stem 30 relative to the post 22 along the lower post face 42 until, when the stem aligns with the groove 40 in one of the registered positions, the spring pushes the stem upward into the groove. With the stem caught in the groove 40, further rotation of the stem is resisted and the holder 26 is stabilized in either its aligned position or in its stowed position. The stem 30, however, is not locked into position, and with sufficient force, the technician may rotate the knob 54, causing the cylindrical surface of the stem to cam against the sidewalls of the groove 40, pushing the stem and attached knob 54 downward along the shaft 34 so that the stem again rotates in contact with the face 42 until it reaches the opposite registered position. To catch and stabilize the stem 30 in its registered position yet facilitate turning the stem out of its registered positions, the sidewalls 46 of the groove 40 preferably angle from the shaft axis between about 50° and about 70°, and the depth of the groove is between about one-tenth to about one-fourth of the diameter of the stem.

Figure 6:
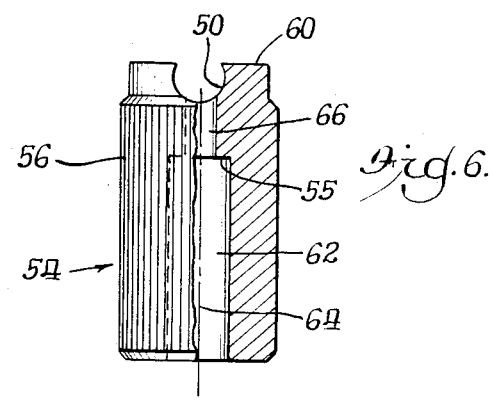
FIG. 6 is an elevation view, partially cut away, of the knob.

The cylindrical knob 54 (FIG. 6) by which the technician rotates the holder has a ribbed outer surface 56 to facilitate gripping by the technician. For affixing the knob 54 to the stem 30, a radial bore 50 matched in diameter to the diameter of the stem is formed at its upper end 60 with the axis of the radial bore more than one radius and less than one diameter, below the upper end of the knob, whereby a minor arcuate portion of the radial bore opens laterally to the upper end. To receive the bolt shaft 32 and spring 44, an axial bore 62 through the knob 54 is provided which includes a larger diameter portion 64 at its lower end and a small diameter portion 66, substantially matched in diameter to the diameter of the shaft 32, extending to the radial knob bore 50.

The knob 54 is affixed to the stem 30 by sliding its radial bore 50 over the end of the stem and then extending the bolt 34, carrying the spring 44 around its shaft 32, through the axial knob bore 62 and through the radial stem bore 50 and screwing the bolt into the threaded bore 48 at the lower end of the post 22. The spring 44 is received in the enlarged lower bore portion 64 of the axial knob bore where it is compressed between the bolt head 52 and the annular surface 55 at the upper end of the enlarged bore portion. The bolt 34 is selected of such a length that when tightened into the post 22, its head 52 is countersunk into the enlarged bore portion 64.

The illustrated embodiment of the filter assembly 10 is adapted to be attached to the microscope by means of a threaded opening 70 in the fitting 24 that is disposed along side the microscope body 12 at location upward of the objective 16, the axis of the threaded opening being parallel to the objective axis 18. Such threaded openings are commonly provided in accessory fittings 24 supplied with microscopes, and if none is provided, such a fitting, e.g., a collar, may be affixed to the microscope body. The assembly 10 is preferably removable from the microscope 13 to enable the fitting to be used for other attachments.

In accordance with an important aspect of the present invention, fitting means, such as a stud 72, by which the depending post 22 is attached to a threaded opening 70, provides for repeated attachment of the assembly 10 to the microscope 13 with the post 22 indexed in the identical rotational position at each attachment, whereby the filter-retaining ring 28 aligns with its central opening 74 in the light path below the objective 16. The depending post 22 has a threaded blind bore 76 extending axially into its upper end. The depending post 72 is attached to the fixture opening 70 by means of the short stud 72 (FIG. 3) that has threads 75 at its upper end for screwing into the fixture opening and threads 77 at its lower end for screwing into the blind bore 76 at the upper end of the post. The relative rotational positions of the depending post 22 and stud 72 are fixed by means of a set screw 78 which is received in a threaded bore 80 that extends radially inward from the outer wall of the post to the axial threaded bore 76.

To index the post 22 with the stud 72 so that the assembly 10 screws into the fixture opening 70, locating the ring 28 under the objective 16 each time, the stud 72 is screwed fully into the threaded fitting bore 70 and then loosened at least about one-fourth turn. Then the set screw 78 is tightened against a non-threaded central portion 82 of the stud. Next, the post 22 is turned to screw the upper threads 75 into the fitting opening 70 until further screwing of the stud 72 upward into the opening is stopped, e.g., by an end of the opening 70 or by the ends of the upper threads 75 screwed fully in the fitting opening 70. With the stem 30 registered in its lower (aligned) position, the set screw 78 is loosened, allowing the post 22 to rotate relative to the stud 72. The post is rotated to precisely align the filter-retaining ring 28 below the objective 16, and the set screw is once again tightened against the stud. Subsequently, the assembly 10 can be removed by unscrewing the post 22 and the indexed stud 72 from the fitting 24 and reaffixed to the fitting by screwing the indexed stud 72 into the opening 70 as far as it will go.

To facilitate turning of the post 22 to affix it or remove it from the fitting 24, a bore 73 extends radially through the post below the axial blind 76 bore, and a narrow rod, such as the blade of a screwdriver, may be inserted through the radial bore for turning and tightening the post and indexed stud 72 into the fitting opening. The upper end of the stud 72 preferably has a slot 74, whereby a screwdriver may be used to initially insert the stud 72 into the bore 76 at the upper end of the post 22.

Figure 8:
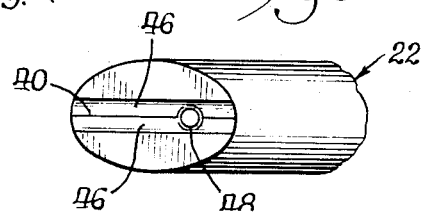
FIG. 8 is an elevation view, partially cut away of the filter-retaining ring of the assembly.
Figure 8:
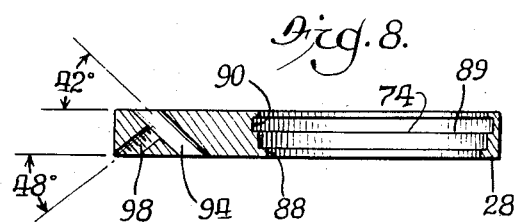

In accordance with another important aspect of the invention, the filter-retaining ring 28 (FIG. 8) is adapted for quick, simple filter replacement, enabling a single assembly 10 to be used for a collection of filters or like optical elements. The ring 28, has a central opening 89 and an annulus or flange 88 at its lower side (with respect to its objective-aligned position) on which the periphery of a filter 14 of appropriate diameter seats. An annular groove 90 is formed in the interior sidewall of the ring 28 spaced above the annulus a distance substantially equal to the thickness of the filter. When a filter 14 is received in the ring 28 seated on the annulus 88, the filter is retained in the ring opening 89 by a flexible O-ring 92 (FIG. 3) that is proportioned to be received in the groove 90 and protrude from the groove into the opening 84 over a peripheral portion of the filter. To replace the filter 14, the O-ring 92 and then the filter are removed through the upper side of the ring 28, a different filter is seated on the annulus and the O-ring is reinserted.

Figure 7:
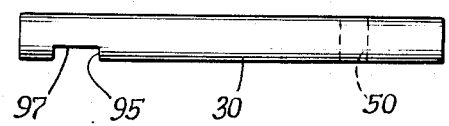
FIG. 7 is an elevation view, partially cut away, of the stem of the assembly.

In the illustrated filter holder 26, the stem 30 and the filter-retaining ring 28 are formed as separate components that are assembled by extending the outer end of the stem into a matched-in-diameter bore 94 formed in an enlarged rear end 96 of the ring. The angle of the bore 94 relative to the plane of the ring 28 determines the stem-ring angle, which as mentioned above, preferably positions the ring slightly skewed from perpendicular to the objective axis. In order to rotationally and longitudinally fix the ring 28 relative to the stem 30, a notch 95 (FIG. 7) is formed into the lower side of the stem 30, and a set screw 96 (FIG. 3), which is disposed within a threaded bore 98 that extends into the ring perpendicular to the stem bore, is tightened against a flat inner surface 97 of the notch 95. The stem and ring could also be formed as an integral component; however, an advantage of having the stem 30 and ring 28 formed as separate components is that the ring might be replaced, allowing a ring with a different size filter opening or a different ring-stem angle to be used with the rest of the assembly.

Figure 2:
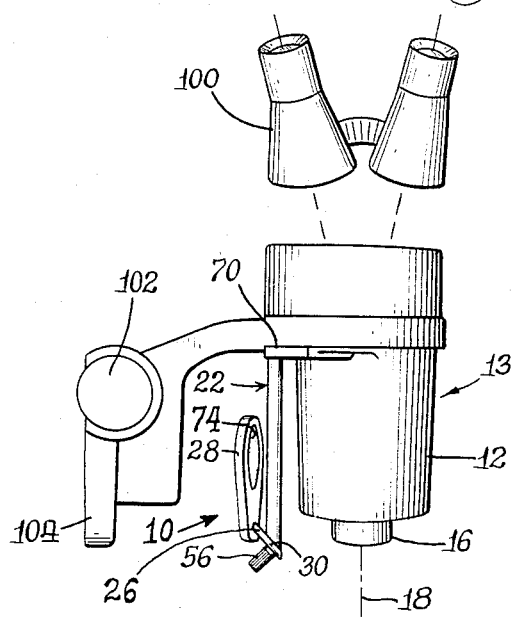
FIG. 2 is a perspective view, similar to FIG. 1, except that the assembly is shown positioning the filter stowed remote from the microscope objective.
Figure 4:
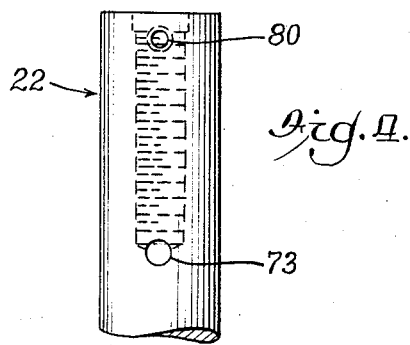
FIG. 4 is an elevation view, partially cut away, of the post of the assembly.
Figure 3:
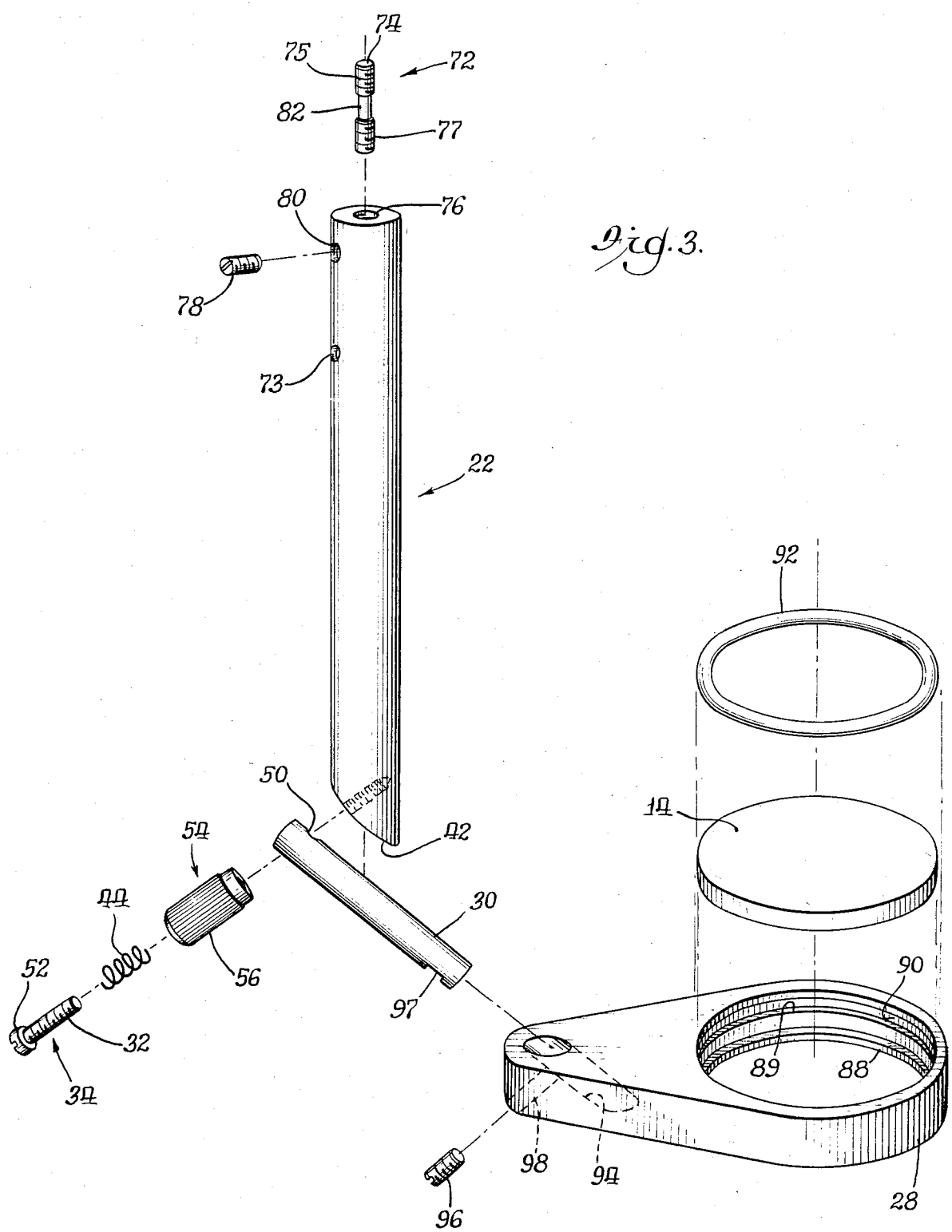
FIG. 3 is a perspective assembly view of the filter assembly.

The microscope 13 shown in FIGS. 1 and 2 is a stereomicroscope having a pair of eyepieces 100 through which the technician views a subject with both eyes through a single objective 16. For convenience of the technician, the head or body 12, which contains the optics, including the objective 16, is mounted by means of a pivot 102 from a stand 104, allowing the technician to adjust the vertical angle of the body. In a microscope 13 wherein the objective-containing body 12 is mounted by a pivot 102 from a stand 104, it is important that the filter-holding assembly 10 be mounted from an accessory fitting 24 that is associated with and moves with the objective body, rather than a fitting on the stationary stand.

Several advantages of the invention can now be more fully appreciated. The assembly is relatively simple and can be produced at a small cost, yet it provides convenience for a technician who must alternately view a subject through a filter and view the subject without the filter, the lens holder being practically instantaneously rotatable from a position in front of the objective to a stowed position along the microscope body out of the way of the technician. The assembly is quickly attachable and detachable from the microscope, and through the preferred stud-set screw arrangement for mounting the assembly, correct positioning of the filter upon reattachment is ensured. Because the filter may be easily removed from the filter ring, a single assembly can be used for positioning any number of different filters in front of the microscope.

While the invention has been described in terms of a preferred embodiment, modifications obvious to one with ordinary skill in the art may be made without departing from the scope of the invention. Although the invention has been described as an assembly for positioning a filter, it is to be understood that other light-altering optical elements, such as a defraction grating, might be placed in the assembly as well. The microscope may come equipped with other means for mounting attachments, in which case the attachment means, and even the configuration of the assembly will be modified accordingly.

Various features of the invention are set forth in the following claims.

What is claimed is:

1. In combination,
a microscope having an elongated body,
eyepiece means at one end of said body,
an objective at the other end of said body,
a filter holder means for holding a filter, and
means for mounting said filter holder means to said body including a vertically extending post fixed to said microscope,
said mounting means including an inclined portion inclined to the vertical post and pivotally mounted with respect to the post to pivot between a downwardly and an upwardly inclined position,
said filter holder being carried by said inclined portion between a first position in alignment with said objective to bring the filter into a generally horizontal plane and a second stowed position in which the filter holder means extends vertically alongside said post and in which the inclined portion is in its upwardly inclined position so that said filter holder means in its stowed position does not interfere with a technician performing manipulations in front of said objective.

2. For a microscope having a body and an objective, and a threaded opening disposed along said body for attachment of accessories, an assembly for alternately positioning a filter in front of the objective and positioning the filter remote from the objective, the assembly comprising:

an elongated post means extending vertically and having a threaded axial bore at a first end, a filter holder means for holding a filter, inclined mounting means for mounting said filter holder means from said post and extending at an incline to the vertical post means, said inclined means being mounted for rotation relative to said post means at a second end opposite said threaded axial bore, a stud having a first threaded end insertable into the threaded accessory opening and a second threaded end receivable in said threaded bore, means for defining a fully inserted position of said first threaded end of said stud into said threaded opening to establish a predetermined rotational position of said stud relative to said threaded opening so that said inclined mounting means is at a predetermined inclination to the post means, means for establishing a fixed rotational position of said post means relative to said second threaded end of said stud that allows said first end to be screwed freely between full insertion into and removal from said threaded opening, whereby inserting said first threaded end into said threaded opening to said fully inserted position defines a predetermined fixed rotational position of said post means relative to said body and locates said inclined means at said predetermined inclination.

3. An assembly according to claim 2 wherein said means for establishing said fixed rotational position comprises a threaded radial bore extending into said post means to said axial bore, and a set screw receivable into said threaded radial bore for tightening against the side of said stud to establish said fixed rotational position.

4. The assembly according to claim 2 in combination with the microscope and the filter.

5. For a microscope having a body and an objective, an assembly for alternately positioning a filter in alignment in front of the objective and positioning the filter stowed closely adjacent to the body of the microscope and remote from the objective, the assembly comprising a stationary post means having means to attach the same to the microscope, said post means having an end face, a filter holder comprising a filter-retaining ring and a stem extending therefrom, means for mounting said stem of said filter holder for rotation along said end face relative to said post means between the position whereat the filter is aligned in front of the objective and at the remote position, said mounting means comprising a shaft extending from said post means, and a bore through said stem receiving said shaft therethrough, detent means formed into said end face, and means for biasing said stem against said end face and into said detent means to alternately register said holder into a stable objective-aligned position and into a stable stowed position.

6. The assembly according to claim 5 in combination with the microscope.

7. The assembly according to claim 5 in combination with a filter.

8. The assembly according to claim 5 in combination with the microscope and a filter.

9. The assembly according to claim 5 wherein said filter-retaining ring has a seat means for positioning a filter within the ring and an internal groove spaced apart from said seat means a distance approximately equal to the thickness of a filter, and a flexible O-ring means receivable in said groove means for holding a filter positioned on said seat means.

10. For a microscope having an elongated body, an objective carried at the end of said body and a fitting for mounting attachments therefrom along a location of the body remote from the objective, an assembly for alternately positioning a filter in alignment with the objective and positioning the filter stowed remote from the objective, the assembly comprising a post having an axis, a first end, means at said first end for removably mounting the same from the fitting so as to extend along the body with its axis generally parallel to the objective axis, a second end having a face at an acute angle relative to the axis of said post and a groove formed in said face, a filter holder including a filter-retaining ring and a stem extending from said ring, means at said second end for mounting said stem along said face for rotation relative to said post in a plane at an acute angle relative to the axis of said post, between said aligned and said remote positions, said mounting means comprising a shaft extending from said face at an acute angle relative to the post axis and a radial bore in said stem that receives said shaft, and means to bias said stem against said face and into said groove for alternate registration in the aligned and the stowed positions.

11. An assembly according to claim 10 wherein said stem is mounted for rotation at about a 45° angle relative to the axis of said post.

12. An assembly according to claim 11 wherein said ring is angled from said stem so that in said aligned position, said ring is generally normal to the objective axis.

13. An assembly according to claim 12 wherein in said aligned position, said ring is skewed from perpendicular to said objective axis between about 2.5° and about 5°.

14. The assembly according to claim 10 wherein said filter-retaining ring has a seat means for positioning a filter within the ring and an internal groove spaced apart from said seat means a distance approximately equal to the thickness of a filter, and a flexible O-ring means receivable in said groove means for holding a filter positioned on said seat means.

15. For a microscope having an elongated body, an objective carried at the end of said body and a fitting for mounting attachments therefrom along a location of the body remote from the objective, an assembly for alternately positioning a filter in alignment with the objective and positioning the filter stowed remote from the objective, the assembly comprising a post having means at one end for removably mounting the same from the fitting so as to extend along the body generally parallel to the objective axis, a filter holder including a filter-retaining ring and a stem extending from said ring, means at the other end of said post for mounting said stem for rotation at about a 45° angle relative to said post between said aligned and said remote positions, and registration means associated with said mounting means for stabilizing said stem at said aligned and stowed positions.

16. An assembly according to claim 15 wherein said ring is angled from said stem so that in said aligned position, said ring is generally normal to the objective axis.

17. An assembly according to claim 16 wherein in said aligned position, said ring is skewed from perpendicular to said objective axis between about 2.5° and about 5°.

* * * * *